(12) United States Patent
Chambers et al.

(10) Patent No.: US 8,204,273 B2
(45) Date of Patent: Jun. 19, 2012

(54) SYSTEMS AND METHODS FOR ANALYSIS OF VIDEO CONTENT, EVENT NOTIFICATION, AND VIDEO CONTENT PROVISION

(75) Inventors: Craig A. Chambers, Leesburg, VA (US); Nikhil Gagvani, Sterling, VA (US); Philip Robertson, Leesburg, VA (US); Helen E. Shepro, Great Falls, VA (US)

(73) Assignee: Cernium Corporation, Reston, VA (US)

( * ) Notice: Subject to any disclaimer, the term of this patent is extended or adjusted under 35 U.S.C. 154(b) by 740 days.

(21) Appl. No.: 12/277,996

(22) Filed: Nov. 25, 2008

(65) Prior Publication Data
US 2009/0141939 A1 Jun. 4, 2009

Related U.S. Application Data

(60) Provisional application No. 60/990,983, filed on Nov. 29, 2007.

(51) Int. Cl.
*G06K 9/00* (2006.01)
*H04N 5/77* (2006.01)
(52) U.S. Cl. .......................... 382/103; 382/282; 386/224
(58) Field of Classification Search .................. 382/100, 382/103–107, 154, 162, 168–172, 173, 177, 382/181, 199, 209, 216, 224, 232, 254, 274, 382/276, 282, 291, 305, 312; 800/8; 348/143; 702/181; 386/224; 709/224; 340/508; 15/120.2; 725/105
See application file for complete search history.

(56) References Cited

U.S. PATENT DOCUMENTS

| | | | |
|---|---|---|---|
| 4,857,912 A * | 8/1989 | Everett et al. | ................. 340/508 |
| 5,486,819 A | 1/1996 | Horie | |
| 5,708,423 A | 1/1998 | Ghaffari et al. | |
| 5,712,830 A | 1/1998 | Ross et al. | |
| 5,801,618 A | 9/1998 | Jenkins | |
| 5,809,161 A | 9/1998 | Auty et al. | |
| 5,875,305 A | 2/1999 | Winter et al. | |
| 5,956,716 A | 9/1999 | Kenner et al. | |

(Continued)

FOREIGN PATENT DOCUMENTS
WO WO 2006/101477 9/2006

OTHER PUBLICATIONS

International Search Report and Written Opinion for International Application No. PCT/US2008/070134, mailed Oct. 7, 2008, 8 pg.

(Continued)

*Primary Examiner* — Seyed Azarian
(74) *Attorney, Agent, or Firm* — Cooley LLP

(57) ABSTRACT

A method for remote event notification over a data network is disclosed. The method includes receiving video data from any source, analyzing the video data with reference to a profile to select a segment of interest associated with an event of significance, encoding the segment of interest, and sending to a user a representation of the segment of interest for display at a user display device. A further method for sharing video data based on content according to a user-defined profile over a data network is disclosed. The method includes receiving the video data, analyzing the video data for relevant content according to the profile, consulting a profile to determine a treatment of the relevant content, and sending data representative of the relevant content according to the treatment.

16 Claims, 14 Drawing Sheets

U.S. PATENT DOCUMENTS

| | | | | |
|---|---|---|---|---|
| 6,069,655 | A | 5/2000 | Seeley et al. | |
| 6,091,771 | A | 7/2000 | Seeley et al. | |
| 6,154,133 | A | 11/2000 | Ross | |
| 6,400,265 | B1 | 6/2002 | Saylor et al. | |
| 6,618,074 | B1 | 9/2003 | Seeley et al. | |
| 6,625,383 | B1 * | 9/2003 | Wakimoto et al. | 386/224 |
| 6,625,838 | B2 * | 9/2003 | Laux et al. | 15/120.2 |
| 6,842,193 | B2 | 1/2005 | Shimose | |
| 6,940,998 | B2 * | 9/2005 | Garoutte | 382/103 |
| 6,956,599 | B2 | 10/2005 | Lim et al. | |
| 6,975,220 | B1 | 12/2005 | Foodman et al. | |
| 7,015,806 | B2 | 3/2006 | Naidoo et al. | |
| 7,113,090 | B1 | 9/2006 | Saylor et al. | |
| 7,203,620 | B2 * | 4/2007 | Li | 702/181 |
| 7,209,035 | B2 | 4/2007 | Tabankin et al. | |
| 7,262,690 | B2 | 8/2007 | Heaton et al. | |
| 7,342,489 | B1 | 3/2008 | Milinusic et al. | |
| 7,403,116 | B2 | 7/2008 | Bittner | |
| 7,450,172 | B2 | 11/2008 | Lee et al. | |
| 7,460,148 | B1 | 12/2008 | Clark et al. | |
| 7,486,183 | B2 | 2/2009 | Luebke et al. | |
| 7,555,146 | B2 | 6/2009 | Huang et al. | |
| 7,612,666 | B2 | 11/2009 | Badawy | |
| 7,636,121 | B2 | 12/2009 | Matsumoto et al. | |
| 7,679,507 | B2 | 3/2010 | Babich et al. | |
| 7,847,820 | B2 * | 12/2010 | Vallone et al. | 348/143 |
| 7,859,591 | B2 | 12/2010 | Tanaka et al. | |
| 7,956,735 | B2 | 6/2011 | Jackson | |
| 2003/0081836 | A1 | 5/2003 | Averbuch et al. | |
| 2003/0164764 | A1 | 9/2003 | Lyons et al. | |
| 2004/0143602 | A1 | 7/2004 | Ruiz et al. | |
| 2004/0183668 | A1 | 9/2004 | Campbell et al. | |
| 2005/0132414 | A1 * | 6/2005 | Bentley et al. | 725/105 |
| 2005/0132424 | A1 * | 6/2005 | Lowe et al. | 800/8 |
| 2005/0134450 | A1 | 6/2005 | Kovach | |
| 2006/0041330 | A1 | 2/2006 | Ansari et al. | |
| 2006/0165386 | A1 | 7/2006 | Garoutte | |
| 2006/0167595 | A1 | 7/2006 | Breed et al. | |
| 2006/0195569 | A1 * | 8/2006 | Barker | 709/224 |
| 2007/0094716 | A1 | 4/2007 | Farino et al. | |
| 2007/0152807 | A1 | 7/2007 | Huang et al. | |
| 2007/0177800 | A1 | 8/2007 | Connell | |
| 2007/0262857 | A1 | 11/2007 | Jackson | |
| 2007/0263905 | A1 | 11/2007 | Chang et al. | |
| 2008/0272902 | A1 | 11/2008 | Kang et al. | |
| 2008/0284580 | A1 | 11/2008 | Babich et al. | |
| 2009/0022362 | A1 | 1/2009 | Gagvani et al. | |
| 2010/0290710 | A1 | 11/2010 | Gagvani et al. | |
| 2011/0090334 | A1 | 4/2011 | Hicks et al. | |
| 2011/0234829 | A1 | 9/2011 | Gagvani | |
| 2011/0279259 | A1 | 11/2011 | Jackson | |

OTHER PUBLICATIONS

International Search Report and Written Opinion for International PCT Application No. PCT/US2008/084835, mailed Feb. 4, 2009, 7 pgs.

Website information, MTeye Wireless Video Verification and Remote Viewing Solutions, May 4, 2007, http://mteye.co.il/home/index.aspx.

Website information, Q-See 16 Ch MPEG4 DVR 250 GB HDD with Built-in DVD Burner, May 14, 2007, http://www.costco.com/Browse//Product.aspx?Prodid=1120047&whse=BC&topnav=&browse=.

Website information, Swann Alert DVR Camera Kit, May 14, 2007, http://www.costco.com/Browse//Product.aspx?Prodid=11206961&whse=BC&topnav=&browse=.

Website information, The iControl Solution, iControl Networks, May 14, 2007, http://www.icontrol.com/howWorksMain.jsp.

Website information, Videofied, May 14, 2007, http://www.videofied.com/en/What_is_Videofied/.

Office Action for U.S. Appl. No. 12/174,225, mailed Jan. 3, 2012.

Office Action for U.S. Appl. No. 11/803,851, mailed Aug. 4, 2010.

Office Action for U.S. Appl. No. 13/083,635, mailed Dec. 8, 2011.

International Search Report and Written Opinion for International Application No. PCT/US2010/032013, mailed Jun. 28, 2010, 8 pages.

Office Action for U.S. Appl. No. 09/234,688, mailed Dec. 10, 1999.

Office Action for U.S. Appl. No. 09/234,688, mailed Apr. 12, 2000.

* cited by examiner

SYSTEMS AND METHODS FOR ANALYSIS OF VIDEO CONTENT, EVENT NOTIFICATION, AND VIDEO CONTENT PROVISION

The present application claims priority under 35 U.S.C. §119(e) to U.S. Provisional Application Ser. No. 60/990,983, filed Nov. 29, 2007, the disclosure of which is expressly incorporated by reference herein in its entirety.

BACKGROUND

1. Field of Technology

The present application discloses the use of video analysis technology (such as that described in part in U.S. Pat. No. 6,940,998 (the "'998 patent"), the disclosure of which is incorporated herein by reference) to analyze video data streams from cameras in real time, determine the occurrence of a significant event, and send a notice that may include a selected segment of the video data associated with the significant event. The application also discloses the use of video analysis technology to determine whether video data includes content corresponding to a user preference for content and providing at least a portion of the video data including the content of interest to be made accessible the user.

2. Background of the Invention

While the means to capture, transport, store, retrieve and display video in large-scale networks have advanced significantly in recent years, technologies available and practical for characterizing their content as one does for other data types have not kept pace. The video equivalent of the search function in a word processor has not been offered. Video analytics technology, which is the adaptation of advanced computer vision techniques to characterize video content, has been limited to highly sophisticated, expensive implementations for industry and government. Furthermore, existing video analytics techniques require large amounts of processing capacity in order to analyze video at or near real time. Present technologies available to consumers and small business users do not provide sophisticated, adaptable and practical solutions. Existing systems cannot be made to operate effectively on off-the-shelf personal computers due to the limitations of processing capacity associated with such platforms. Additionally, existing closed circuit television systems are limited to dedicated network configurations. This is due to the high bandwidth requirements associated with streaming live video. The requirement for a dedicated network inhibits distribution of collected video beyond a location close to the video imager or camera. Existing technologies for video transport require too much bandwidth to effectively be employed across readily-available networks having low bandwidth capacity, such as most wireless networks.

Additionally, current systems for viewing live or recorded video require that the user know the location of, or the path to, the desired video stream on the network or within the closed circuit system and actively "pull" the video in order to view it. In the case of large, loosely organized libraries of live or recorded video, this task may be extraordinarily onerous, usually requiring viewing many scenes containing nothing of interest to the user. One recent advance has been to use the output of electronic sensors to trigger the transmission of video from a nearby camera. Some video systems even incorporate "video motion detection," a technique that senses gross image changes, to initiate this action. These systems offer no way to determine the relevance of content or to distinguish between non-activity and events of interest. The distinction between what is of interest and what is not must be performed by a human. This activity can be characterized by long periods of inactivity punctuated by rare but sudden episodes of highly significant activity requiring the application of focus, careful consideration and judgment. In the case of real-time observation systems, significant events will in all likelihood go unnoticed by the user. These situations are thought to contribute to the slow adoption of "nanny-cam" systems. They also limit the ability of online content providers to create convenient video distribution services for new classes of mobile phones and similar communication and display devices.

Because existing systems need to be installed in a dedicated network, they do not have the flexibility to accommodate the dynamics of a rapidly-developing or transient situation. In addition, existing systems typically send a video representation of observed location to one end-point. In some cases, a user will want to have the ability to change the recipient of video data from an observed location.

Traditional closed-circuit TV systems require that a person sit at a display screen connected to a network in order to observe a location. If a user wants to be able to see what happened in his or her absence, he or she must watch the video of the period of his or her absence. This can be inconvenient, time consuming, and boring. To mitigate these effects, a user may choose to view the recordings at an increased play speed. This can increase the chances that something of significance will be missed. This situation limits the ability of the user, such as a homeowner or small business owner, to have peace of mind when the user must be away from the video display.

Existing video data storage and retrieval systems only characterize stored material by information or metadata provided along with the video data itself. This metadata is typically entered manually, and only provides a single high level tag for an entire clip or recording, and does not actually describe the content of each scene or frame of video. Existing systems do not "look inside" a video to observe the characteristics of the video content in order to classify the videos. Classification therefore requires that a human must discover what content a video contains, usually through watching the video or excerpts therefrom, and provide tags or other descriptive information to associate with the video data. This process can be time- and energy-intensive as well as extremely inefficient when dealing with large amounts of video data, such as can be encountered in cases of multiple, real-time streams of video data.

What is needed, then, is a video content description technology that enables distributed observation of user-defined video content across existing networks, such as the Internet and wireless communication infrastructure, and observation across multiple geographically-distributed sites. What is also needed is a system that automatically forwards video to interested personnel in response to the existence of noteworthy events and that allows flexibility to specify and change the recipient of video data. What is further needed is a system that can send notifications and information to users wherever they are.

SUMMARY OF THE INVENTION

A novel method and system for remote event notification over a data network are disclosed. The method involves receiving and analyzing video data, optionally consulting a profile to select a segment of interest associated with a significant event from the analyzed video data, optionally sending the segment of interest to a storage server, optionally further consulting the profile to encode the segment of interest at the storage server and to send data associated with the segment of interest to one or more end devices via the wireless network, optionally triggering the end device to download the encoded segment of interest from the storage server, and optionally displaying the segment of interest at the end device.

Also disclosed is a novel method for delivering personalized video content to users on a network. The method involves analyzing image data within a video stream in real time or near real time, optionally consulting a profile to select a segment or segments of interest in the video stream, and optionally sending the segment of interest or the entire video stream to users of the network whose profiles match the segment of interest.

DETAILED DESCRIPTION

Several applications of video analysis technology are disclosed below. One application can be used to analyze video data streams from cameras in real time, determine the occurrence of a significant event, and send a notice that may include a selected segment of the video data associated with the significant event. The application also discloses the use of video analysis technology to determine whether video data includes content corresponding to a user preference for content and making at least a portion of the video data, including the content of interest, accessible to a user or other designated recipient.

Mobile Video Content Service

Figure 1:
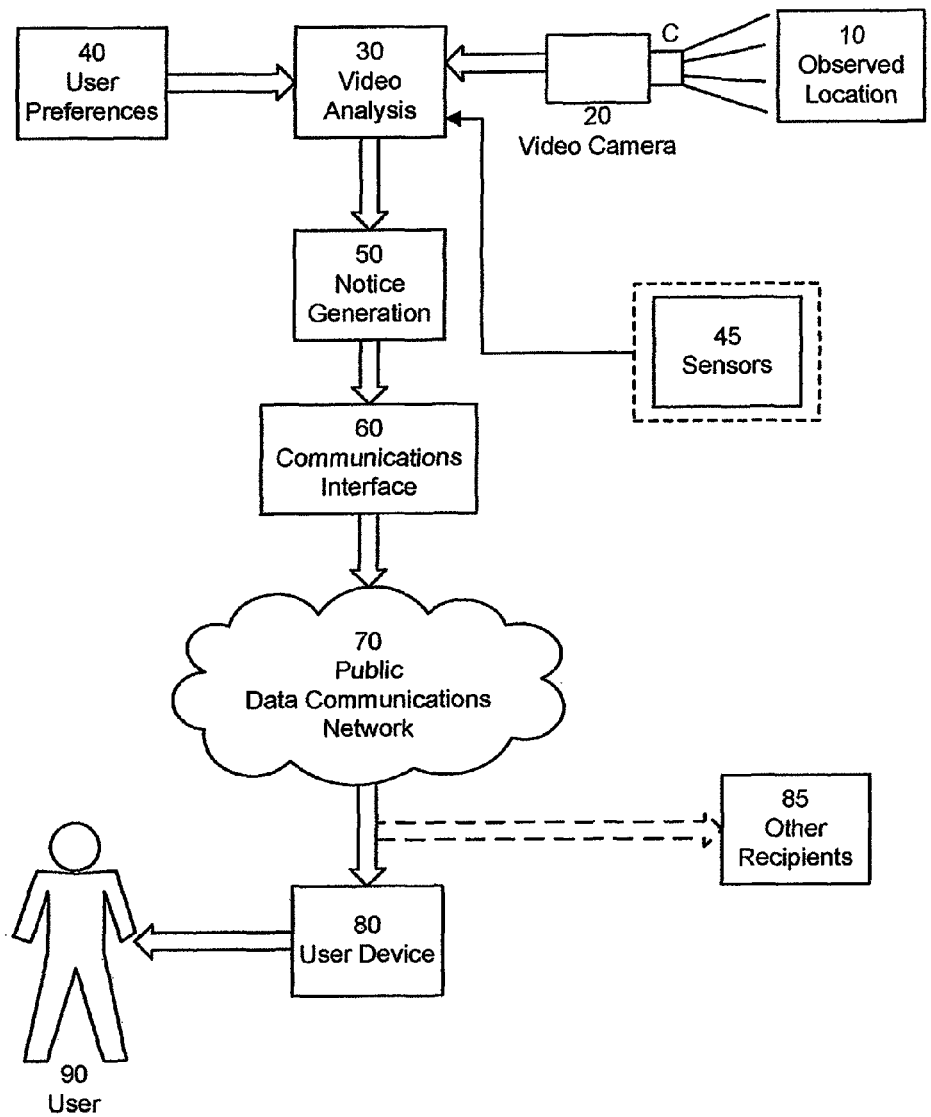
FIG. 1 is a schematic illustration of an environment in which video analysis technology can be used for event notification.

An environment in which video analysis technology can be used for event notification is illustrated schematically in FIG. 1. A user 90 may wish to receive notice of an event of interest to the user if and when it occurs at an observed location 10. A video camera 20 is positioned to view the observed location 10 and can provide video data to a video analysis functional block 30. Sensors 45 may also be associated with observed location 10 and output from such sensors 45 can be provided to video analysis functional block 30. User preferences 40 can include information about the kinds of events occurring at observed location 10 that are of interest to the user 90. Video analysis functional block 30 refers to user preferences 40 in conjunction with analyzing video data from video camera 20 to determine whether an event of interest to user 90 has taken place at observed location 10.

If it is determined in video analysis functional block 30 that an event of interest has occurred, that determination can be provided to a notice generator functional block 50 which can generate an event notice to be provided to the user 90. The event notice may include a segment of video data or some data representative of the segment of video data corresponding to the event of interest, and be provided to a communications interface 60. Communications interface 60 can be communicatively coupled to a public data communications network 70, such as the Internet, and thus can send the event notice via the network 70 to a user device 80. User device 80 can display an event notice to user 90. Optionally, the event notice can also be sent to other recipients 85.

Figure 2:
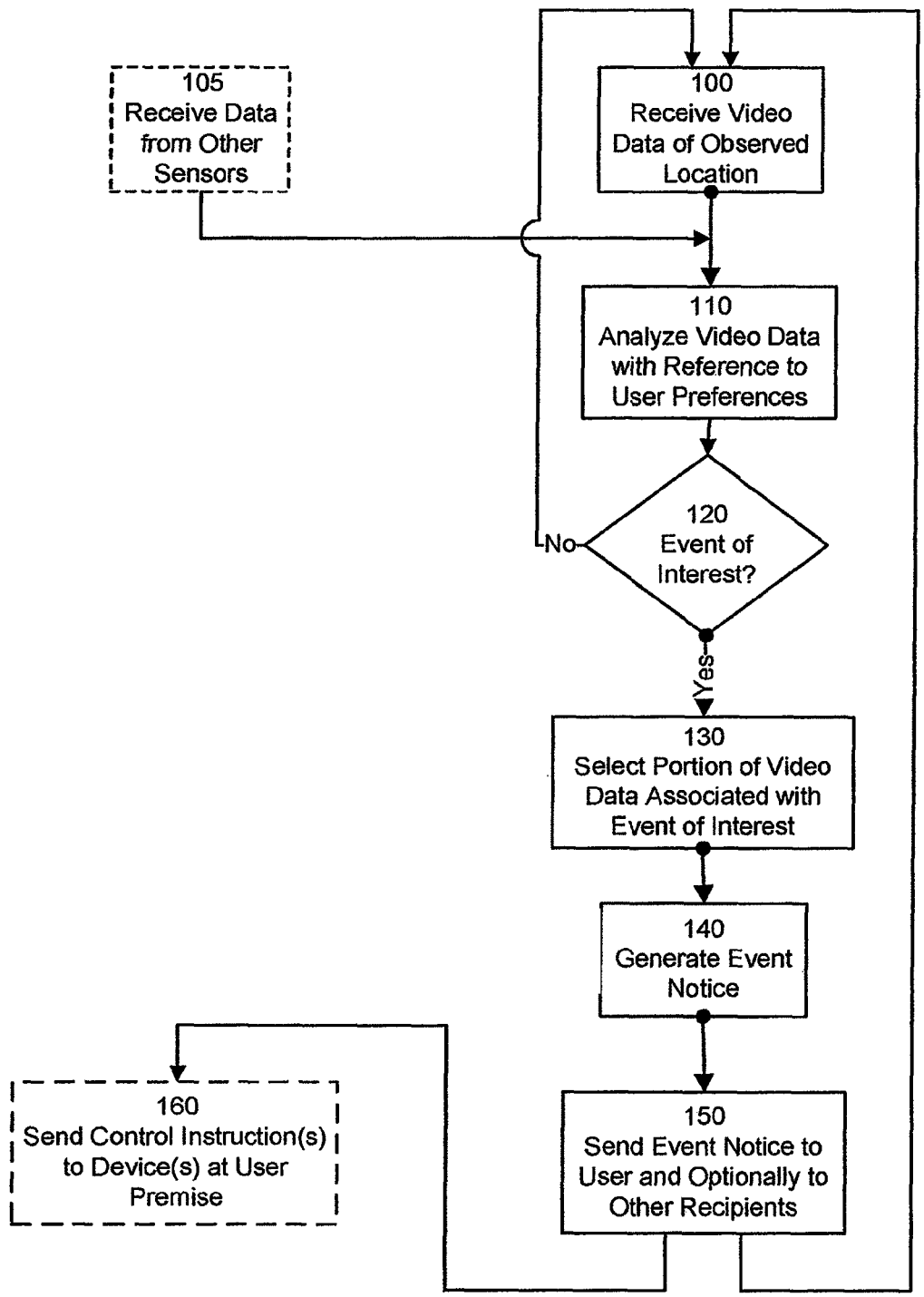
FIG. 2 is a flow chart of a disclosed method.

A process for observing the observed location 10 and sending event notices to user 90 is illustrated in FIG. 2. In step 100, video data of observed location 10 is received from video camera 20. Optionally, in step 105, data from other sensors associated with the observed location, such as a motion sensor, may be received. At step 110 the video data is analyzed with reference to user preferences 40 and optionally the data received in step 105. In step 120 a determination is made as to whether an event of interest to user 90 has occurred at observed location 10. If not, then the observation simply continues (receiving more video data.) If so, then at step 130 a portion of video data associated with the event of interest is selected and then at step 140 an event notice is generated which, as noted above, can include the selected portion of the video data. The event notice is then sent to the user device 80 at step 150. Optionally, at step 160, control instructions may be sent to controllable devices at the observed location such as for switching on a light or locking a door.

In the environment illustrated in FIG. 1, the observed location can be any setting that a user wishes to watch for events of interest. For example, observed location 10 can be a user's home including any room, doorway, window or surrounding area such as an entrance area, sidewalk, driveway, adjacent roadway, postal box, yard, porch, patio, pool, garden, etc. Observed location 10 can also be a workplace, office, parking lot, reception area, loading dock, childcare center, school, storage facility, etc. For example, the system can be programmed to detect when a person enters one of the aforementioned areas and to push associated video of the event of interest to a user device. In one such application, the camera can be facing a door, for example a front or back door of a residence, in order to observe household traffic. Such an application can notify a user when a person opens an observed door, for example when a child comes home from school. In another application, a camera can face outward from a front or rear door for exterior detection. In this application, a user can be notified, for example, as soon as someone approaches within a specified distance of the observed door, and video of the event can be sent to the user.

The video camera 20 can be any device capable of viewing an observed location 10 and providing video data representing a sequence of images of the observed location. Video camera 20 can be a device having a lens that focuses an image on an electronic tube (analog) or on a chip that converts light into electronic impulses. Preferably, video camera 20 can output video data in digital form, but conversion of data from an analog camera into digital form can be performed in any suitable way as will be apparent to the artisan. The images may be in any part of the light spectrum including visible, infrared or ultraviolet. Video camera 20 can be a monochrome (black and white) or color camera. Video camera 20 can be set in a fixed position or placed on a pan-and-tilt device that allow the camera to be moved up, down, left and right. The lens may be a fixed lens or a zoom lens.

Video analysis functional block 30 can be implemented in a variety of ways, but may advantageously be implemented using the techniques disclosed in the '998 patent performed on a suitable hardware device, for example, video analytics software operating on a conventional personal computer. Video analysis functional block 30 can be integrated into another piece of hardware, such as a network device, the video camera 20, the notice generator functional block 50, or the communications interface 60.

User preferences 40 may reflect any user-specified preferences for the following circumstances or events noteworthy to user 90, such as the presence or movement of a person, vehicle or other object at the observed location 10 or particular area of the observed location 10. Similarly, notice generator block 50 can be implemented on software running on a conventional personal computer. Notice generator functional block 50 can be integrated into another piece of hardware, such as a network device, the video camera 20, the video analysis functional block 30, or the communications interface 60.

Communications interface 60 may be any suitable device capable of communicating data including an event notice to user device 80 via a network 70. For example, communications interface 60 may be a cable modem, DSL modem or other broadband data device and any associated device such as a router.

User device 80 can include any device capable of receiving, from network 70, and displaying or rendering to a user an event notice, including a personal computer with display, cellular telephone, smart phone, PDA, etc. A user 90 can be an individual or a group of individuals.

Figure 3:
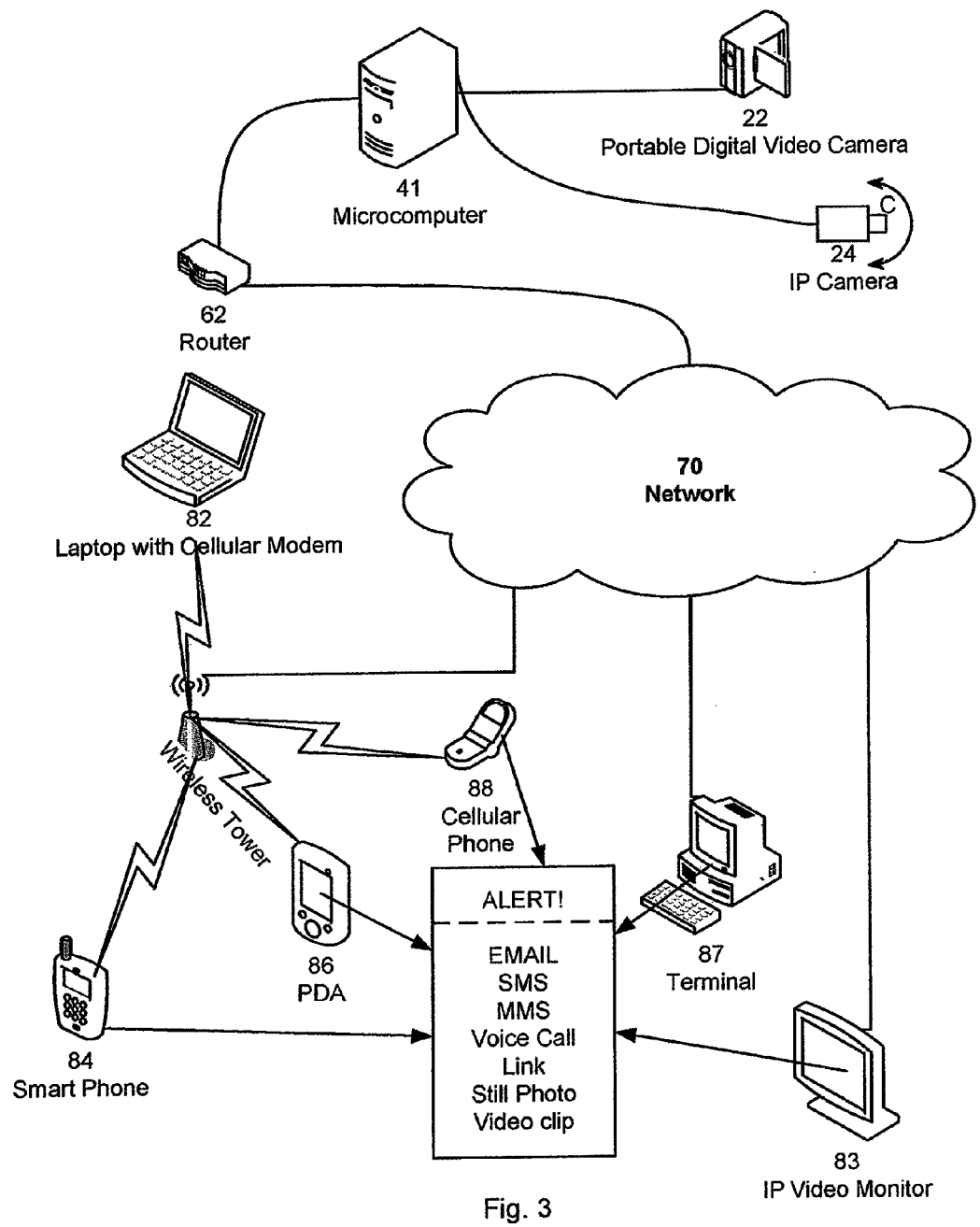
FIG. 3 is a schematic representation of a disclosed system.

Some of the possible implementations of the elements described above are illustrated in FIG. 3. The video camera 20 can be implemented as portable, digital video camera 22 or IP camera 24. A microcomputer 41 or personal computer can store the user preferences. The video analysis can be performed on its processor or on a notice generator. A router 62 coupled to the microcomputer 41 serves as communication interface 60 and communicates via the network 70, such as the Internet or worldwide web, with any of a variety of user devices 80, including via a wireless communications network (such as a cellular network with a communications tower) to a lap top computer with a cellular modem 82, a smart phone 84, PDA 86 or cellular phone 88. The user devices can be any other device able to be coupled directly or indirectly to the communications network, such as an IP video monitor 83, computer terminal 87 or a laptop computer coupled to a wide area network.

As described above, user preferences 40 can include information about the kinds of events that are of interest to the user. For example, the user-defined profile can be used to cause an event notice to be sent when an object is removed from or placed in a defined observed location or area. Such an embodiment can be used, for example, to watch fences, gates, stations, or other public or private areas for the presence of any designated behavior. In one application, a camera can watch over a home office, artwork, office safe, or other valuables. User preferences 40 can also include information about the form of event notice the user wishes to receive (resolution, encoding, compression, duration), video data to be included with a notice, the destination(s) of the notice, and actions that may be taken at the observed location (lock a door, switch on a light). Additionally, user preferences 40 can govern the interaction of cameras, users, user devices, recording and analytics. These interactions can be driven by the results of analysis, such as occurs at step 110 in FIG. 2.

User preferences 40 can be maintained in a user profile. User preferences 40 can be associated with individual cameras, recorders, analytics, users, recipients, user devices and types of responses. Groups of such individuals can also be defined, to which particular user preferences can be applied. Each member of the group can inherit the properties that pertain to that group. Membership in multiple groups is possible. For example, a camera group may have all cameras that are from a single manufacturer and are set up for video at CIF resolution at 15 frames per second, using MPEG-4 Simple Profile compression over the RTP protocol. An analytics group may include a set of "outdoor, parking lot" events such as a loitering person and an illegally parked vehicle, with clutter rejection set for sunlit illumination under snowy conditions.

Figure 4:
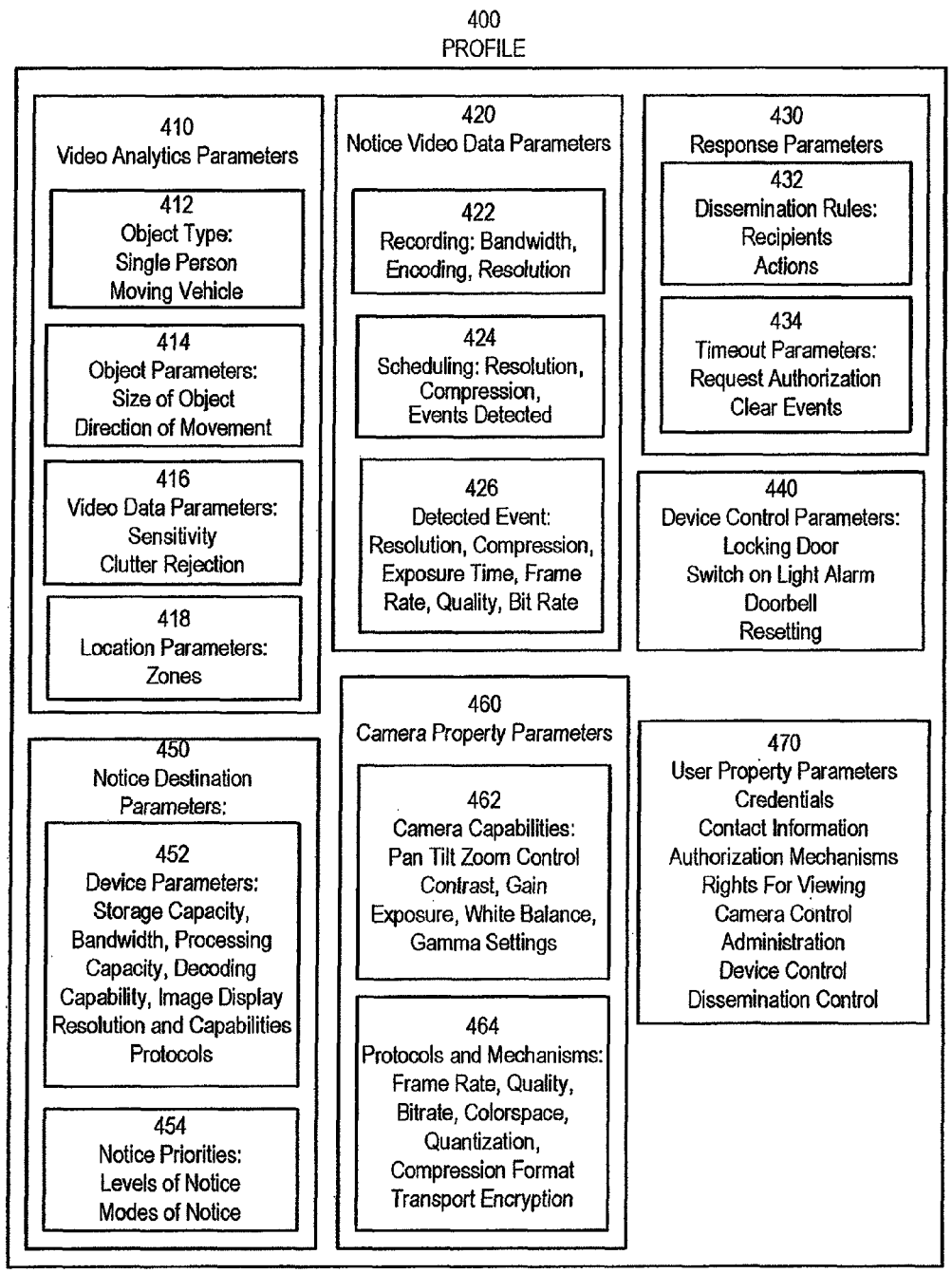
FIG. 4 is a function chart of an element of a user profile.

An exemplary embodiment of a user profile is illustrated schematically in FIG. 4. User profile 400 can include video analytics parameters 410, notice video data parameters 420, response parameters 430, device control parameters 440, notice destination parameters 450, camera property parameters 460, and user property parameters 470.

Video analytics properties 410 govern video analysis for event detection and recognition. These properties enable or disable the detection of specific events. Multiple video event detection capabilities can be provided such as the detection of a single person, a stationary object or a moving vehicle. Additionally, they specify control parameters for each event, such as the size of a stationary object or the direction of movement of a vehicle. Video analytics parameters 410 can include parameters provided to the video analysis technology to identify what types of objects are of interest (object type parameters 412, for example a person, a vehicle or a type of object such as a package), what characteristic of each object is relevant (object parameters 414, such as the size or shape of an object, whether a person is standing, sitting, lying, walking or running, whether a vehicle is stationary or moving, etc.), to specify the handling of the image data from the camera (video data parameters 416, such as sensitivity, and clutter rejection to accommodate environmental effects such as rain, snow, waves) or illumination effects (shadow, glare, reflections), and to identify aspects of the observed location (location parameters 418, such as whether there are different zones in the field of view of the camera to be handled differently, e.g., a yard, sidewalk, driveway or street). For example, location parameters 418 for an application using an outdoor camera viewing both a door and driveway could be set to send an event notice upon the detection of a car in the driveway zone, and the presence of a package near the door.

The notice video data parameters 420 can include parameters provided to the video analysis technology specifying how video associated with an event of interest is recorded Recording parameters 422 can specify the bit rate of the recorded video data, what encoding standard is to be used and the resolution of the video. Scheduling parameters 424 specify a mapping between the date, time and properties. Scheduling parameters 424 can specify how recording parameters are to change based on the time or date, such as how to vary resolution and compression based on time of day and day of the week, and what event events are of interest during particular times. Camera properties such as resolution or compression quality may be modified based on the schedule. Similarly, the set of events detected and their properties can be changed on a schedule.

Detected event parameters 426 specify how video data is to be treated based on the detected event, such as the resolution, compression, frame rate, quality, bit rate and exposure time to apply in the case of different detected events such as fastmoving objects, very slow-moving objects, very small objects, illuminated objects, etc. Detected event parameters can be modified for the entire frame or for parts of the frame based on an event that is detected, as disclosed in US Patent Application Publication 2006/0165386. For example, if a video analytics block determines that a frame sequence contains a person, then the user profile 400 associated with the video analytics block might be programmed to specify that the subject video sequence be compressed according to a compression scheme that preserves quality, even at the expense of storage space. In contrast, if the same system determines that a video sequence contains a neighborhood cat, which is not of interest to the user, the profile might be programmed to specify that the system record the video using a compression scheme that conserves a relatively large amount of storage space as compared to the raw video.

The disclosed technology allows the properties of a camera to also be changed based both on a schedule, according to scheduling parameters 424, and on events that are detected by a video analytics block, according to detected event parameters 426. For instance, in order to enable optimal conditions for capture of a license plate of a vehicle based on the detection of a vehicle and an estimate of its speed, the exposure time for the camera can be adjusted during the nighttime hours to capture a non-blurred version of the license plate.

The response parameters 430 can include parameters provided to the video analysis technology specifying actions to take when sending an event notice in response to the detection of an event of interest. Response parameters can include rules governing how notifications associated with detected events are disseminated to users and devices. For example, dissemination rules 432 provide a mapping between an event or multiple events and actions resulting from these events. Actions can be any combination of electronic communication in the form of text, multimedia attachment, streaming video, or in the form of device control. Dissemination rules 432 can specify to whom and in what form a notice is to be sent. Response parameters 430 can be set, for example, to allow a friend or neighbor to observe a person's house when the person is out of town by setting the parameters to send notifications to the friend or neighbor as another recipient.

Response parameters 430 can also include timeout parameters 434 specifying how long the system is to persist in notifying a user, request authorization parameters specifying when and from whom the system is to request authorization to send an event notice to a user or other recipient, etc. Timeout parameters 434 can specify mechanisms for clearing or resetting an event condition. A response may be as simple as a timeout after which all conditions are cleared or reset. Other examples of timeout parameters 434 include automated clearing of event conditions when any video is requested or viewed regardless of the user, or any device-initiated actions. Complex timeout parameters can require the user to interact with a local or remote device, or send electronic communication back to the system which would then authorize the action and clear the condition.

Device control parameters 440 can include parameters provided to the video analysis technology specifying other actions to take, in addition to or in lieu of sending an alert, in response to the detection of an event of interest. The device control parameters 440 can specify, for example, whether a door gets locked, a light gets turned on or off, sirens or alarms sound, whether an alarm is to be reset, a radio signal or beacon gets transmitted, etc. An example interaction is to switch on an exterior light only when a person is detected, but not if a vehicle is detected, or to sound the doorbell when a person is detected within a certain distance from a door. Additionally, recording properties may be modified or further analysis may be triggered.

The notice destination parameters 450 can include device parameters 452 provided to the video analysis technology for interacting with devices used to record, stage and view video and notifications. The notice destination parameters 450 can specify treatment of video for particular device requirements such as storage capacity, bandwidth, processing capacity, decoding capability, image display resolution, text display capabilities and protocols supported, such as email (POP, SMTP, IMAP), SMS (text messaging), RSS, web browser, media player, etc. These properties can be used to facilitate transmission to particular user devices, such as higher compression for transmission to low-bandwidth devices, such as wireless devices. The video analysis technology can refer to notice destination parameters 450 to implement scalable compression based on video analysis with an MPEG-4-like streaming framework for mobile content delivery.

The notice destination parameters 450 can also include parameters provided to the video analysis technology specifying various notice priorities 454, for example, based upon different notice conditions. The notice priorities 454 can have different associated levels of and modes of notice. For example, for a critical notice a user can specify that he or she be notified by a voice call to his or her cellular telephone. The call can contain a recorded message notifying the user of the associated notice condition. Another priority can be associated with a different level of notice, for example, an email or a text message. Additionally, the user profile can specify that a selected segment of video associated with the notice condition be sent automatically to the user's mobile device. For example, a user can specify that in the case of an unexpected vehicle in the driveway, the system send a representation of the selected segment to the user's mobile device, for example, a cell phone, personal digital assistant, smart phone or a laptop computer.

The camera property parameters 460 can include parameters provided to a camera to control camera capabilities 462 such as frame rate, quality, bit rate, colorspace, quantization, compression format, transport, and encryption. It can also specify protocols and mechanisms 464 for the control of the cameras, for example for pan tilt zoom control, and further including contrast, gain, exposure, white balance, and gamma settings.

User property parameters 470 specify valid users for the system, their credentials, contact information and authorization mechanisms. User property parameters 470 also specify rights for viewing, camera control, administration (ability to modify profile properties), device control and dissemination control.

The parameters in user profile 400 may be specified by user 90. Default profiles may be defined from which a user may choose, and which a user may modify. A user may have a user profile 400 for each camera associated with an observed location and/or may have a different profile for different times of the day, days of the week, seasons of the year, etc. A user can save multiple profiles for multiple circumstances, for example, a vacation profile, a natural disaster profile, a normal profile, a guests profile, or others, to accommodate different circumstances.

A user profile 400 may be stored locally with the device performing the video analysis, for example the video analysis functional block 30 of FIG. 1. For example, it may be stored in persistent storage on the same microcomputer on which video analysis software operates. Alternatively, user profile 400 may be stored remotely, provided that it is readily available as input for the video analysis. A suitable user interface may be provided to allow the user to define and modify a user profile 400.

Figure 5:
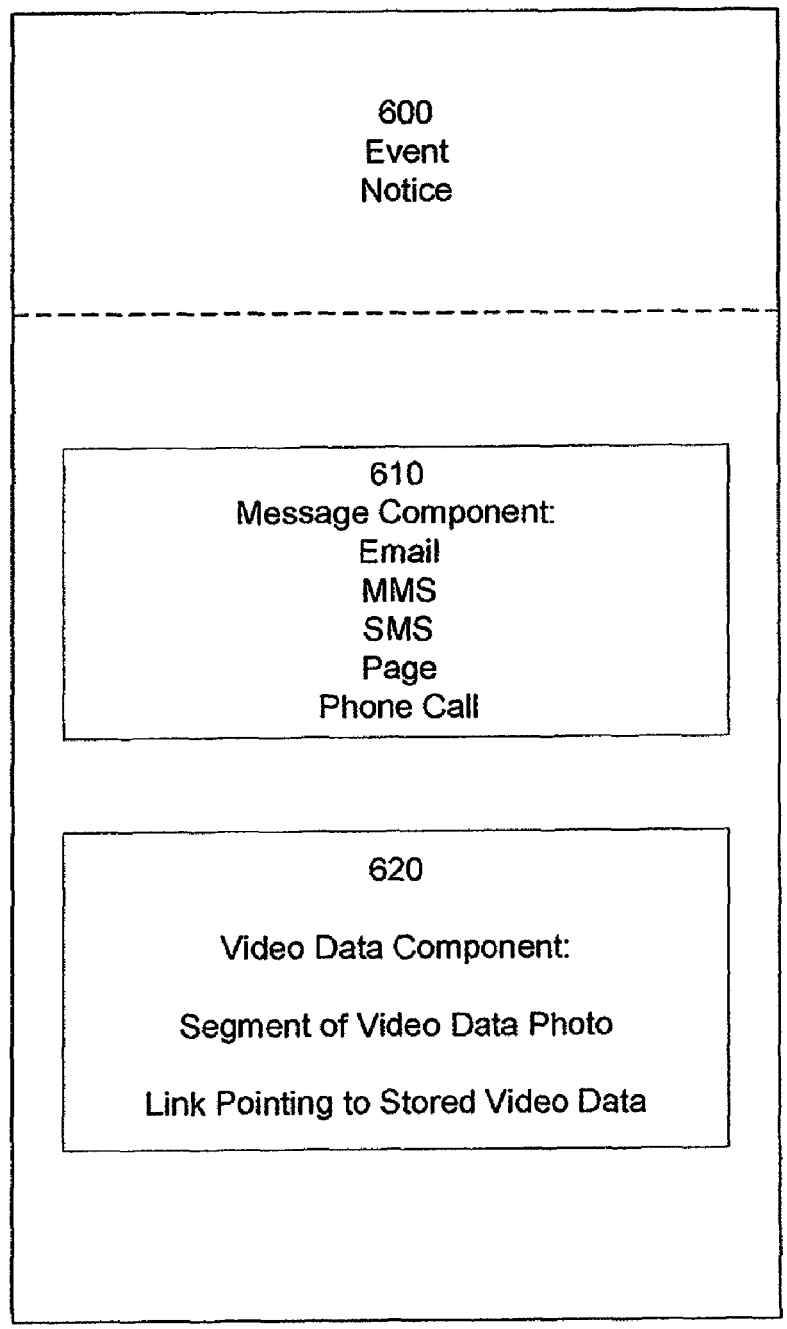
FIG. 5 is a block representation of an event notice sent to a user by the system of FIG. 3.

As discussed above, if analysis of the video data with reference to the parameters in the user profile determines that an event of interest has occurred at the observed location, an event notice can be generated and sent to the user. FIG. 5 schematically illustrates an exemplary event notice 600. The event notice 600 can include a message component 610 and a video data component 620. Message component 610 can include text that conveys to a user relevant information about the event, such as "a vehicle has entered the driveway of your residence" or "a person has entered your backyard." This textual information can be in any format suitable for the user device to which notice 600 is to be sent, such as an email, MMS, SMS, or page. Information can also be provided in another form, such as an audio message, which may be generated by text-to-speech conversion, to be conveyed by a call to a telephone (cellular, land line, voice over IP, etc.).

Video data component 620 can include selected segments of video data associated with the event of interest. For example, in conjunction with the message "a person entered your backyard" contained in message component 610, the video data component 620 could include video data for the time period starting with the person entering the backyard (or a field of view of the camera if it does not encompass the boundary of the backyard), and ending with the person leaving the backyard, or ending after some more limited period of time. The video data can be a modified version of the raw video data from a video camera, for example, at a lower frame rate, lower resolution, compressed and/or encoded. Again, the format of the video component is selected to be viewable for the user device to which the event notice 600 will be sent. The video data component 620 may alternatively be some other representation of the video data of potential interest to the user. For example, the data may be in a form of one or more still images selected from among the video data frames to be representative of the video data. This may be appropriate, for example where the user device 80 can render a photo but not a video clip. Alternatively, the video data component 620 may be in the form of a link or other pointer to a network location from which the user may pull the video data of interest.

As discussed above, the format of the event notice 600, including the format of message component 610 and the video data component 620, can be determined by reference to the parameters in the user profile 400 and may depend on, for example, the capabilities of the user device(s) 80 to which event notice 600 is to be sent, the nature of the event, the portion of the observed location to which the event relates, etc. Similarly, the destinations of the event notice 600 can be determined by reference to the parameters in the user profile 400. For example, user profile 400 may specify that an event notice 600 relating to a potential intrusion in the back yard of observed location 10 during a weekday should be sent to the user's PDA and to the user's computer at the user's workplace.

Figure 6:
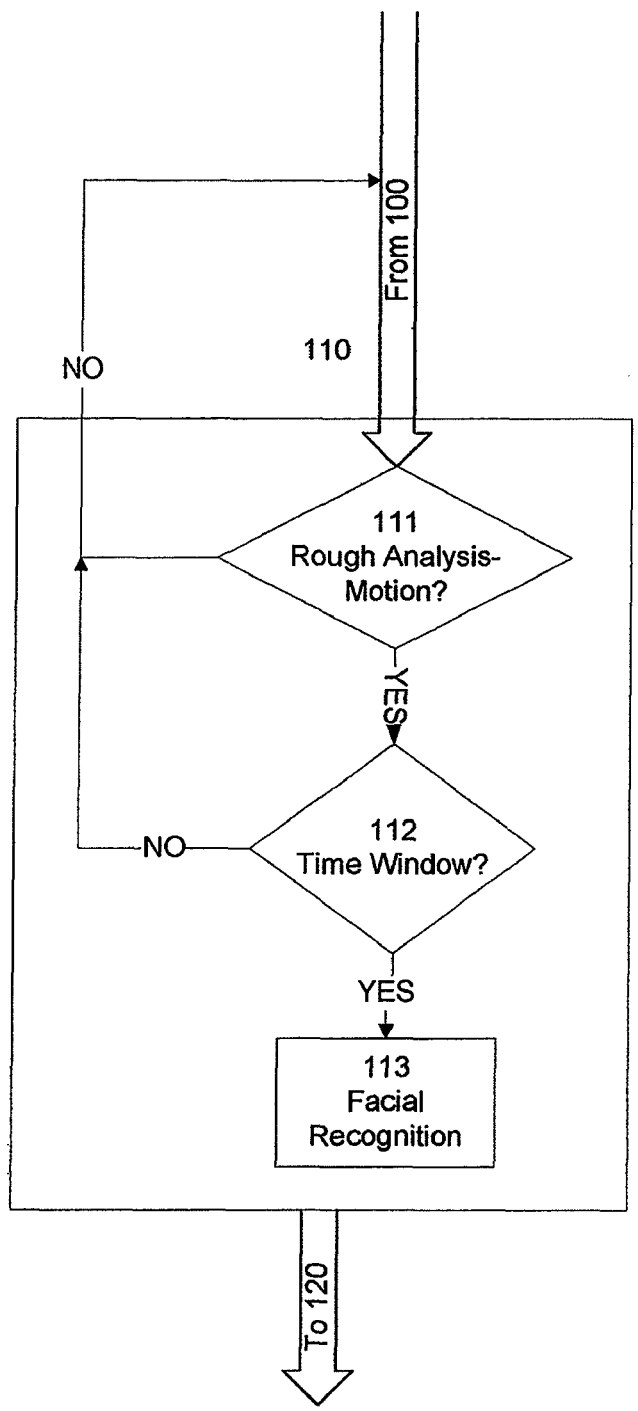
FIGS. 6 and 7 are flowcharts of disclosed methods.

The analysis of video data can include many different analytical steps. FIG. 6 is a flowchart showing some analytical steps that can be included in step 110 of FIG. 2. In step 111, the video can be subjected initially to a rough analysis to detect the presence of motion by non-trivially-sized objects. If there is such motion, then in step 112 it is determined whether the motion takes place during a particular time window, such as in the evening or in the morning. If so, then in step 113 the video data segment associated with the movement can be subjected to further analysis, for example, facial recognition analysis. If no motion is detected, or if motion is detected but not in the relevant time window, then no further analysis is conducted and new video data is analyzed. These optional analyses can be specified in the user profile 400, and can reduce the possibility of false or undesired event notices.

Figure 7:
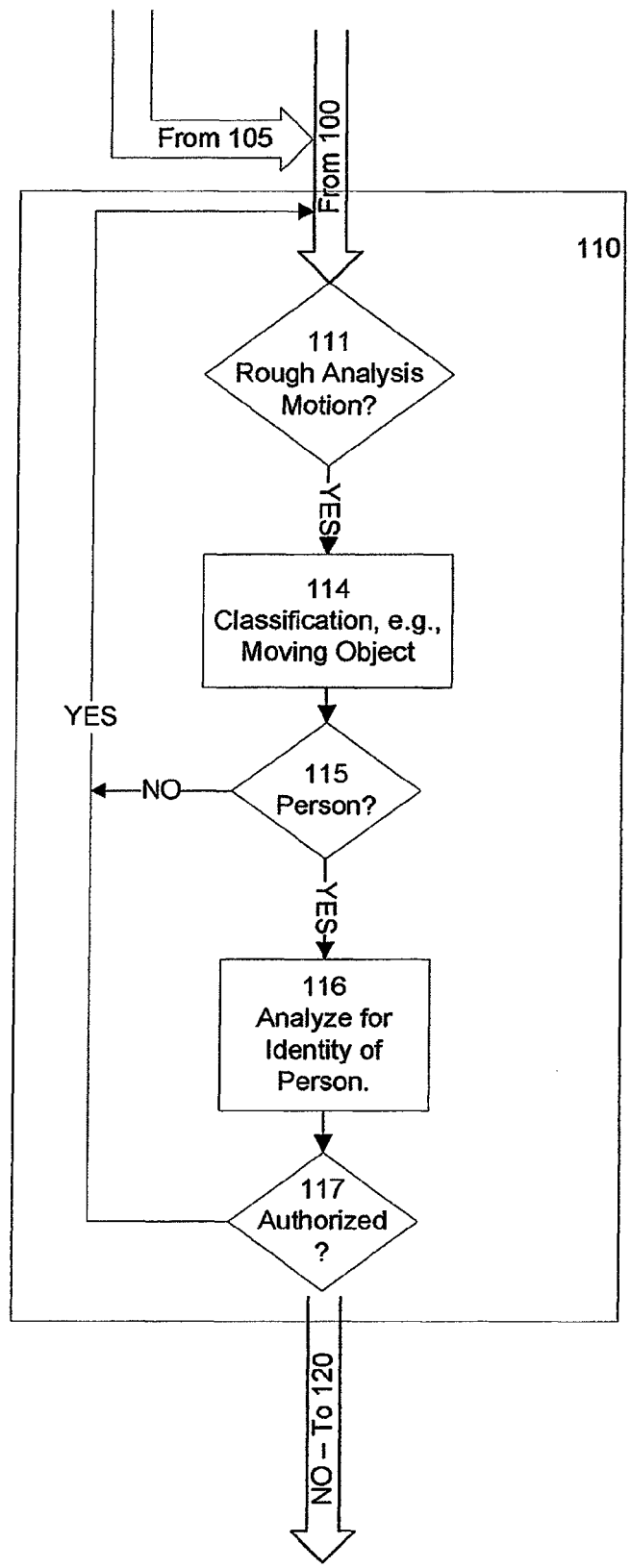

The particular video analysis to be performed can also be based upon other data input, such as input from other sensors as in step 105 of FIG. 2. FIG. 7 is a flowchart showing some analytical steps that can be included in step 110 of FIG. 2 based on video data received in step 100 and data received from other sensors in step 105. If data is received from step 105, such as output from a motion sensor indicating that motion of some object was detected, then in step 111 the video data can be initially subjected to a rough analysis to detect motion. If motion is detected, then in step 114 further analysis of the video data can be conducted to classify the moving object, e.g., a person, animal, pet, or vehicle. In step 115 a determination is made whether the object is a person. If so, then in step 116, further analysis is performed to determine the identity of the person, e.g. by comparison to image data for known persons. If not, observation of the video data continues. In step 117 a determination is made whether the person is authorized to be present at the observed location (or the portion viewed by the video camera), e.g., because the person is unknown, or because the person is known but does not have explicit authorization. If not, observation of the video data continues.

EXAMPLES

The following examples illustrate various ways in which the capabilities and functionality described above can be put to use.

Monitoring Vehicles by Location

Figure 8A:
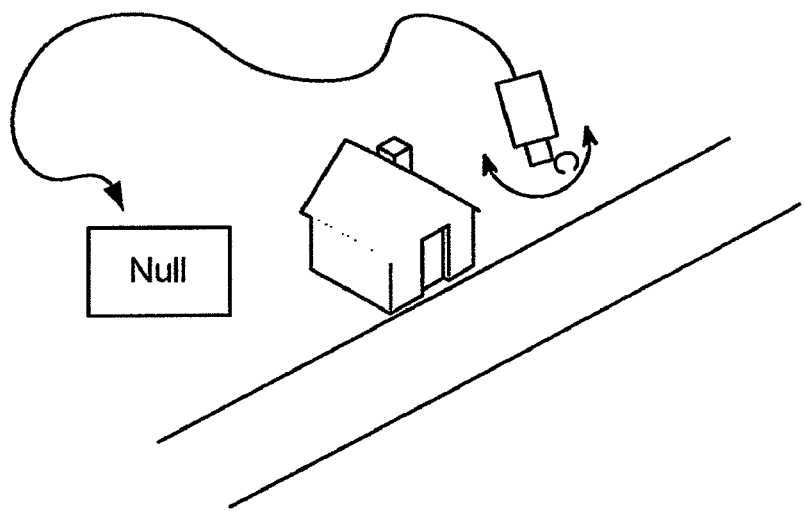
FIGS. 8A, 8B, 9A, 9B, 10A, and 10B are schematic representations of video analysis and handling of detected events.
Figure 8B:
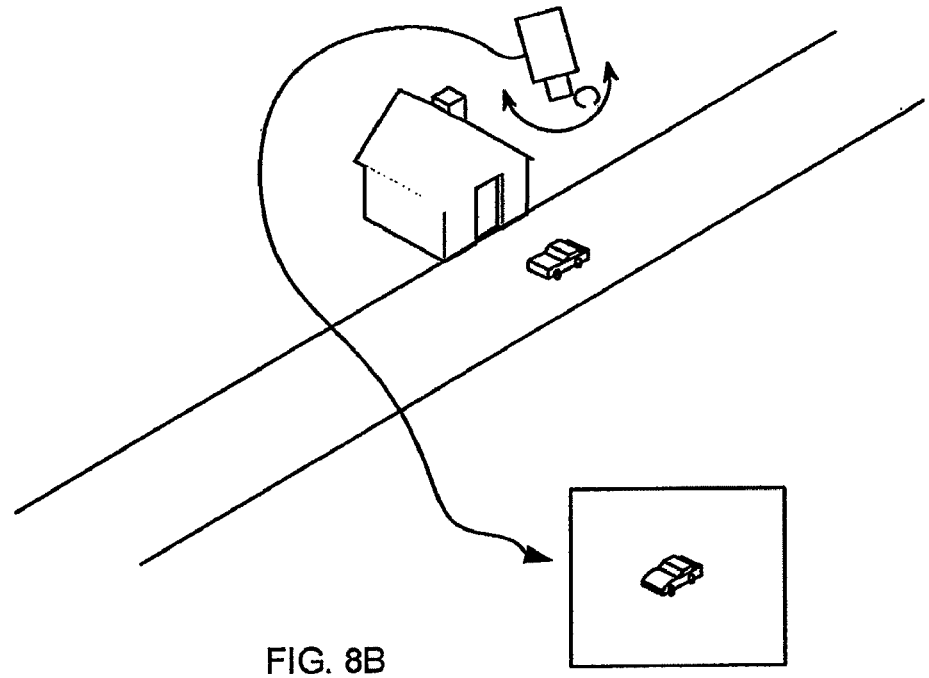

Applications of the inventive technology can be used to detect whether cars/trucks approach or park in front of a residence, or in a small business setting, for example to monitor when a vehicle approaches a loading dock. FIGS. 8A and 8B illustrate how a user can be notified in a residential setting. In this embodiment, the camera is trained on a monitored location, in this case the road fronting the residential property. In this setting, a user can receive an event notice, for example, when a vehicle enters a camera's field of view. As illustrated in FIG. 8A, when the monitored location is clear, the system sends no event notification. When the car enters the field of view of the camera, as shown in FIG. 8B, the video analysis functional block, which in this embodiment is integrated into the video camera, refers to user preferences in conjunction with analyzing the video data from the video camera to determine whether an event of interest to the user has taken place at the monitored location. In this embodiment, the car approaching in front of the residence constitutes an event of interest according to the user profile; therefore, that determination is provided to a notice generator functional block which generates an event notice, provided to the user. In this embodiment, the event notice includes a segment of video data corresponding to the event of interest, i.e., video of the car. This video of the car is displayed at the user device to the user. The user has specified in the user profile to send a segment of interest of the video data, rather than a mere image, in the case of the detection of a passing car due to the nature of the event of interest—the user is interested in information about the behavior of the car as well as its presence.

Monitoring Deliveries

Figure 9A:
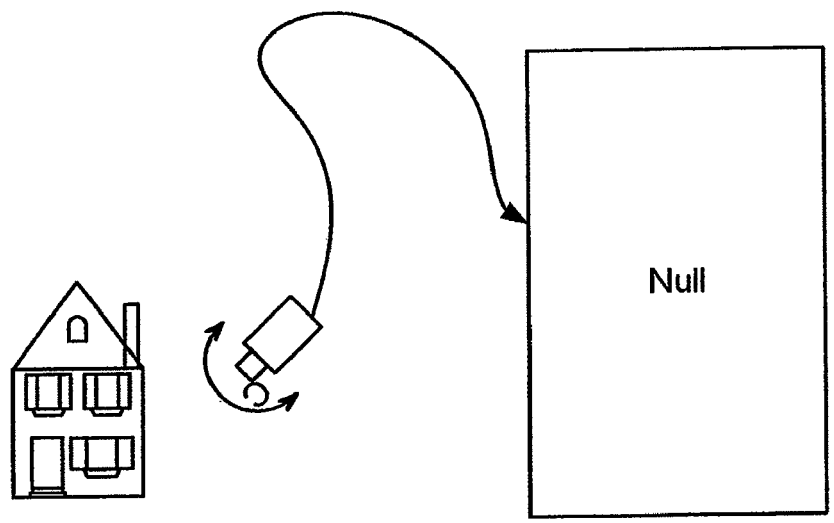
Figure 9B:
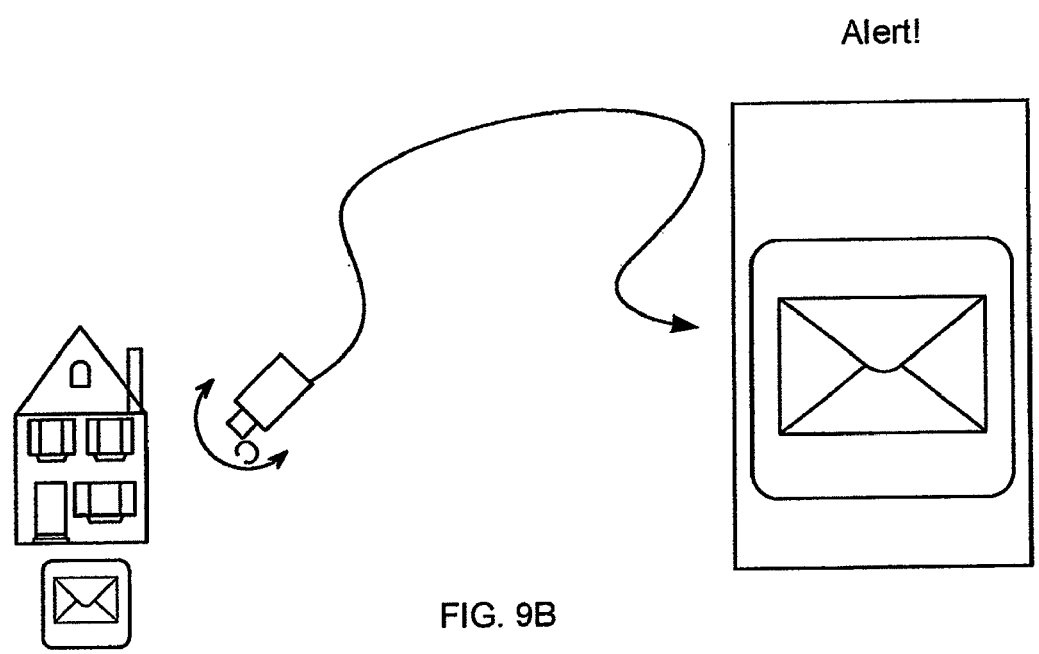

In another application, a user profile can direct the system to notify a user when a new, stationary object is introduced into the field of view. FIGS. 9A and 9B illustrate how a user can be notified when a delivery has been made to a monitored location. As illustrated, the video camera is trained at a delivery drop-off point, in this case the front porch (the monitored location), to monitor for delivery of a package that is expected to be left at the drop-off point, and that will need to be recovered. As illustrated in FIG. 9A, when no package is present at the monitored location (no event of interest), the system sends no event notice to the user. When the package is placed in the field of view of the camera, as illustrated in FIG. 9B, the video analysis functional block refers to user preferences in conjunction with analyzing the video data from the video camera to determine whether an event of interest to user has taken place at monitored location. In this embodiment, the package sitting on the front porch constitutes an event of interest according to the user profile; therefore, that determination is provided to a notice generator functional block which generates an event notice, provided to the user. In this embodiment, the event notice includes a frame from a segment of video data corresponding to the event of interest. This frame of the package is displayed at the user device to the user. In this embodiment the user has specified in the user profile that only a frame of the video showing the package be displayed at the user device, due to the lack of additional informational content associated with video of the package—merely the presence of the package is what is interesting to the user. In another embodiment, such an application can be implemented to help conduct a shipping business efficiently, for example, so that personnel inside a warehouse can become aware of an approaching delivery or pick-up, and make preparations in order to expedite the process.

Invisible Fence

Figure 10A:
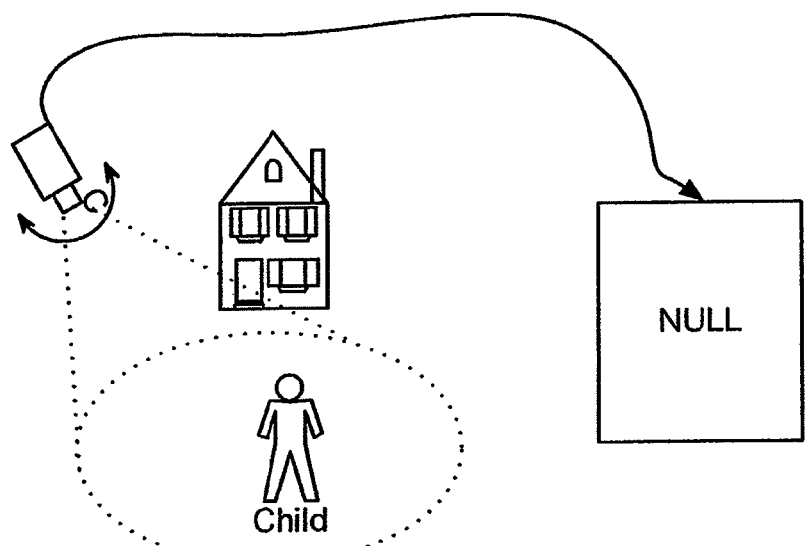
Figure 10B:
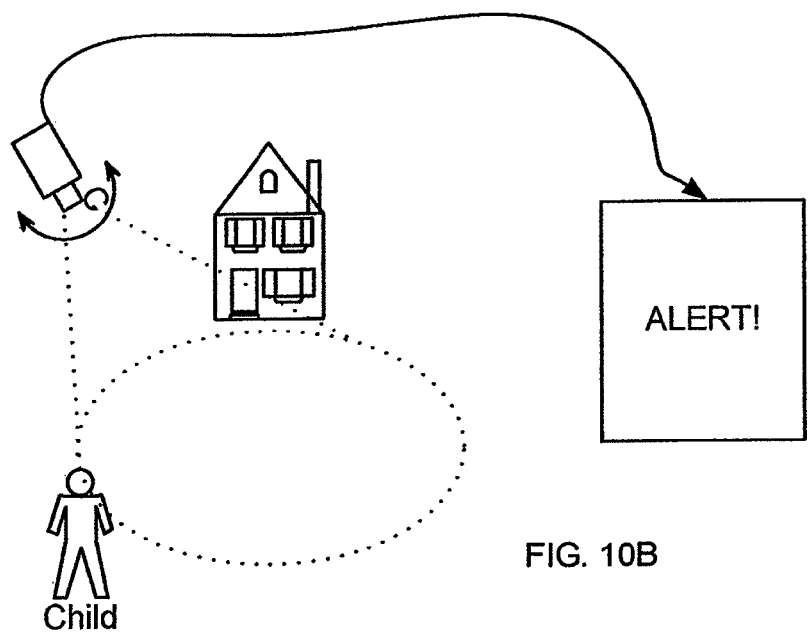

FIGS. 10A and 10B illustrate how an "invisible fence" can be drawn around a monitored location, without the use of traditional motion sensors and/or door or window switches. This enables the perimeter of the fence to be controlled merely by adjusting the camera perspective, and therefore it can be placed anywhere. In this embodiment, the invisible fence is used to monitor the front yard of a residence and to send an event notice to the user when a child has left the yard. As illustrated in FIG. 10A, when the child is present in the yard, the video data reflects the child's presence and the video analysis functional block does not determine the existence of an event of interest based on the user profile. In FIG. 10B, the child has left the yard, and video data of the monitored location reflecting this event is received from the video camera (step 100 of FIG. 2). Next, the video data is analyzed with reference to user preferences (step 110 of FIG. 2), and the determination is made that an event of interest to the user has occurred at the monitored location (step 120 of FIG. 2). Therefore, a portion of the video data associated with the event of interest is selected (step 130, FIG. 2) and then the event notice ("ALERT!") is generated (step 140, FIG. 2) and sent to the user device (step 150, FIG. 2). In other embodiments, a user can use an invisible fence application of the invention to find out if a vehicle stops in front of a house or drives by slowly, keep an eye on neighbors or strangers who park close to home, know when small children, elderly family or pets enter "off-limits" areas or leave the house. Additionally, the user profile can be specifically tailored to fit a wide range of situations. For example, if a user has a "night owl" in the family or late morning snoozer, the user profile may be adapted to these specific household patterns.

Transitory Monitoring

Another application of the inventive technology is for transitory monitoring. This can enable a fewer number of people to more effectively monitor a boundary or border for activity. For example, such an application can be deployed along a national border, a toll station to watch for toll violators, or a turnstile to watch for turnstile violators. For example, such an application can be used to detect a person walking the wrong way in an exit area. This application can also be used to accurately detect wrong way motion in circumstances of heavy traffic and crowding that would confuse or disable existing solutions. Such an application can also allow for the erection of an invisible (video) "fence" to establish transitory protection and monitoring zones around objects/areas of interest, for example for temporary applications. This application can be much more expedient to erect than an actual physical impediment such as a fence, and can be transparent to people in the area. This application can be employed in situations where the erection of a physical obstacle is undesirable or impractical, such as at a memorial or other attraction, the enjoyment of which would be degraded by a physical impediment. Such an application could also be used to create transitory boundaries over water or unsteady or unstable ground, such as swamp land, where the erection of a physical boundary is impractical or impossible. Such an application can be useful in areas, for example, such as wildlife preserves or reserves where construction is not allowed or would interfere with the ecology. Such an application can also be used, according to a user defined profile, to track the migration of wildlife, without influencing or interfering with such migrations. This can also be useful to determine populations of wildlife. This application can also be used underwater in conjunction with underwater cameras to track specific fish, or other sea life such as specific whales or dolphins. Such an application can be field-expedient in that it can be erected anywhere a wireless broadband or other data link can be established. Such an application can easily be moved to adapt to dynamic monitoring situations.

Notify Additional Recipients

Figure 11:
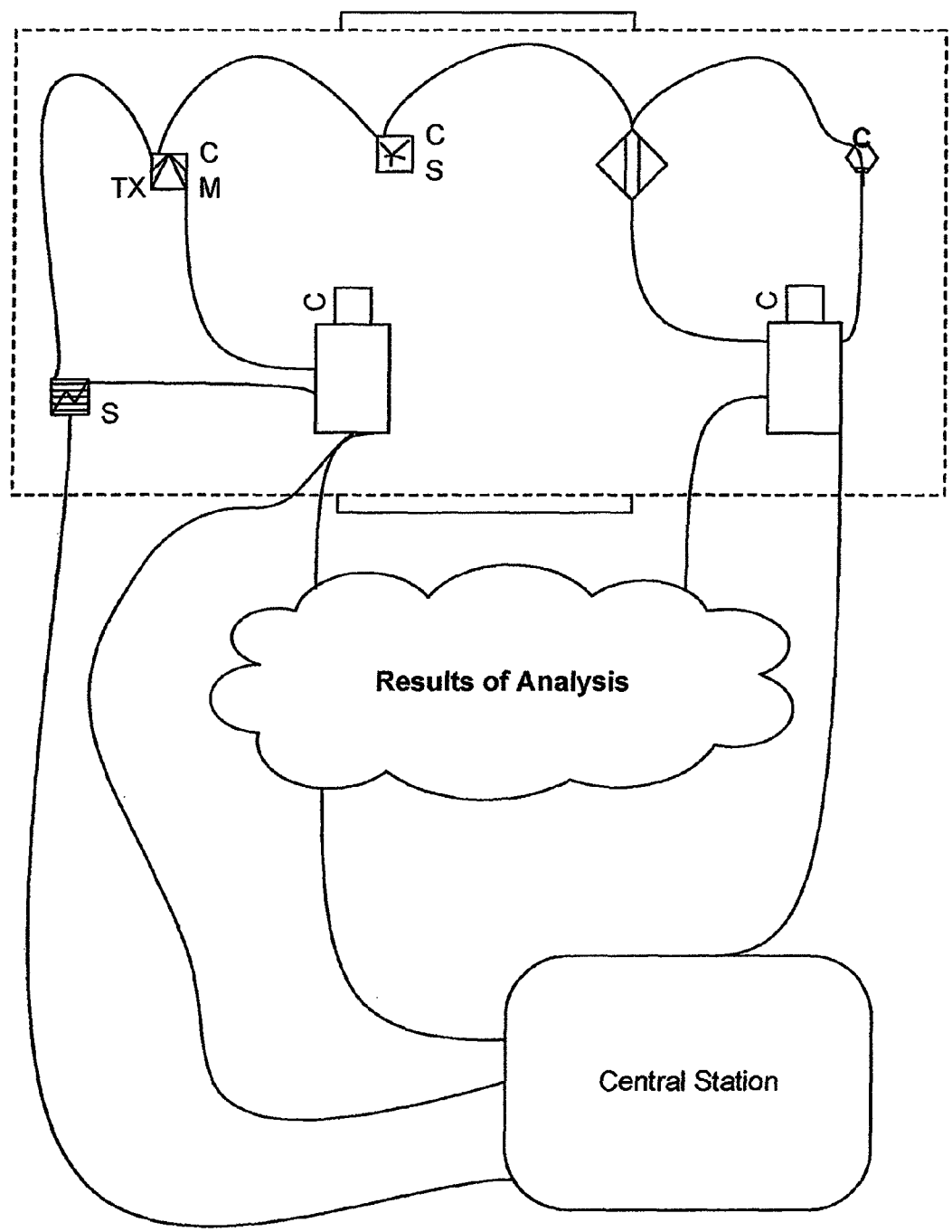
FIG. 11 is a schematic illustration of a system in which selected video is transmitted to a central security station.

As noted above, applications of the inventive technology may be used to provide an event notice with or without selected segments of video to other recipients in addition to or instead of the user; based on the circumstances, for example, to law enforcement, neighbors, or relatives. For example, an event notice with an uncompressed video excerpt may be sent to the local police department. FIG. 11 illustrates an embodiment that transmits video to a central station of a security service provider to aid in possible later identification of an intruder. In this embodiment, various sensors, corresponding to the sensors 45 of FIG. 1, are incorporated into the monitored location. This embodiment shows how at least the following sensors car be used: a bistatic beam sensor (labeled TX, C, M); a glass breakage sensor (labeled C, S); a simple electrical current contact sensor (labeled CT); and a proximity sensor (no label). FIG. 11 also illustrates an alarm unit with status screen (labeled S) at the monitored location. In this embodiment video data of monitored location is received from video cameras 20 (step 100, FIG. 2) along with data from the other sensors associated with the monitored location (step 105, FIG. 2). The video data is analyzed with reference to user preferences and the data from the other sensors (step 110, FIG. 2). A determination is made as to whether an event of interest to the user has occurred at monitored location and an event notice is generated which is then sent to the central station (corresponding to the other recipients 85 of FIG. 1).

Portions of video corresponding to times immediately before and after an alarm trigger can also be sent. A user, such as a private homeowner, can have a compressed excerpt with event notice sent directly to his or her wireless personal user device. The mode of the event notice can be controlled by the programming of the user defined profile. For example, a user can specify that he or she receive an email, voice message, SMS, or compressed video clip directed to his or her personal media-capable user device, depending on the time of day and day of the week. Related applications may also be used to send selected segments of incoming video data corresponding to a time period after the event of interest at the monitored location has been detected. Video segments can be sent from the central station to recipients in encoded, unencoded, compressed, uncompressed or another format, depending on the capabilities of the recipient and the need for quality in the transmitted video.

"Stake Outs"

The inventive technology can also be used for portable and/or temporary "stake outs." In such an application, a video analytics functional block can be deployed on a mobile processing platform, such as a notebook computer. The mobile processing platform can have an integrated wireless data connection, such as a cellular modem, and be connected to one or more video cameras. Such an application can be used, for example, by a small reconnaissance team, which may like to maintain an inconspicuous or undetected presence. Such an application can allow such a small team to overwatch a much larger area than would otherwise be possible even with multiple cameras, in the absence of the video analytics. This application can reduce "vigilance fatigue," and thereby extend the useful operational window of the reconnaissance team. Such an application, like the other applications disclosed herein, can also be used with cameras having special capabilities such as night-vision cameras, thermal imaging devices, and infrared cameras.

Infant Minder

Figure 12:
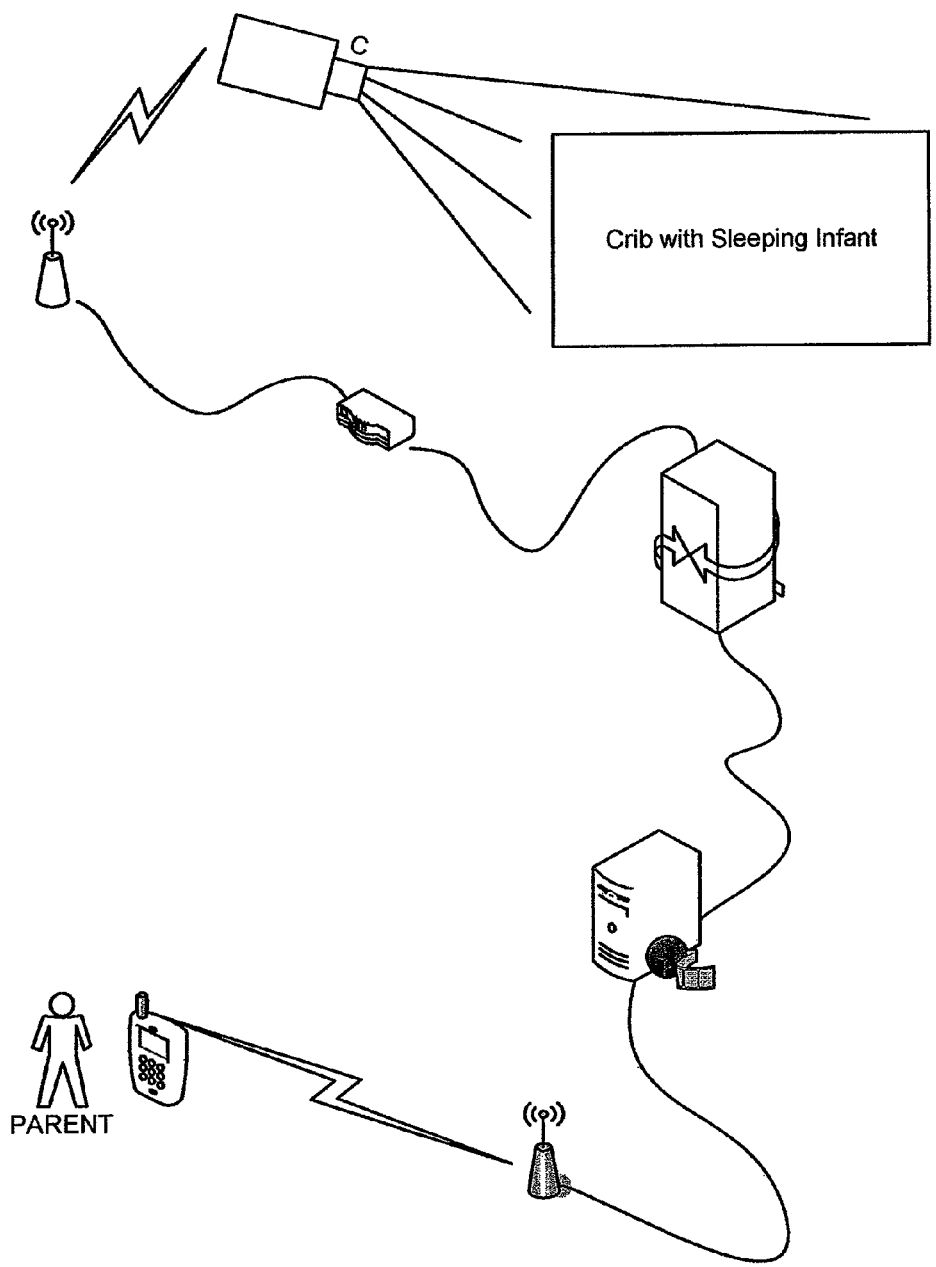
FIG. 12 is a schematic representation of an embodiment of a system for observing an infant's sleeping area.

FIG. 12 illustrates how a wireless digital video camera can be used to watch an infant in a crib or other sleeping area, who may be left at home in the care of someone other than a parent. This embodiment can thus serve as a "nanny cam." When the infant's parents are out of the house this embodiment can provide them peace of mind by analyzing video of the sleeping infant and to provide an event notice to the parents' smart phone if it is determined that the infant is in distress. Because of the limitations of the wireless connections to both the camera and the smart phone, it would be impractical if not impossible to continuously stream video data to the phone. In this embodiment, only relevant portions of video are sent with the event notice.

Video Analysis for Selecting Content Matching User Preferences

Several other applications of video analysis technology are described below. These applications involve analysis of video to select content matching user preferences.

Consumer Video Subscription Service

Figure 13:
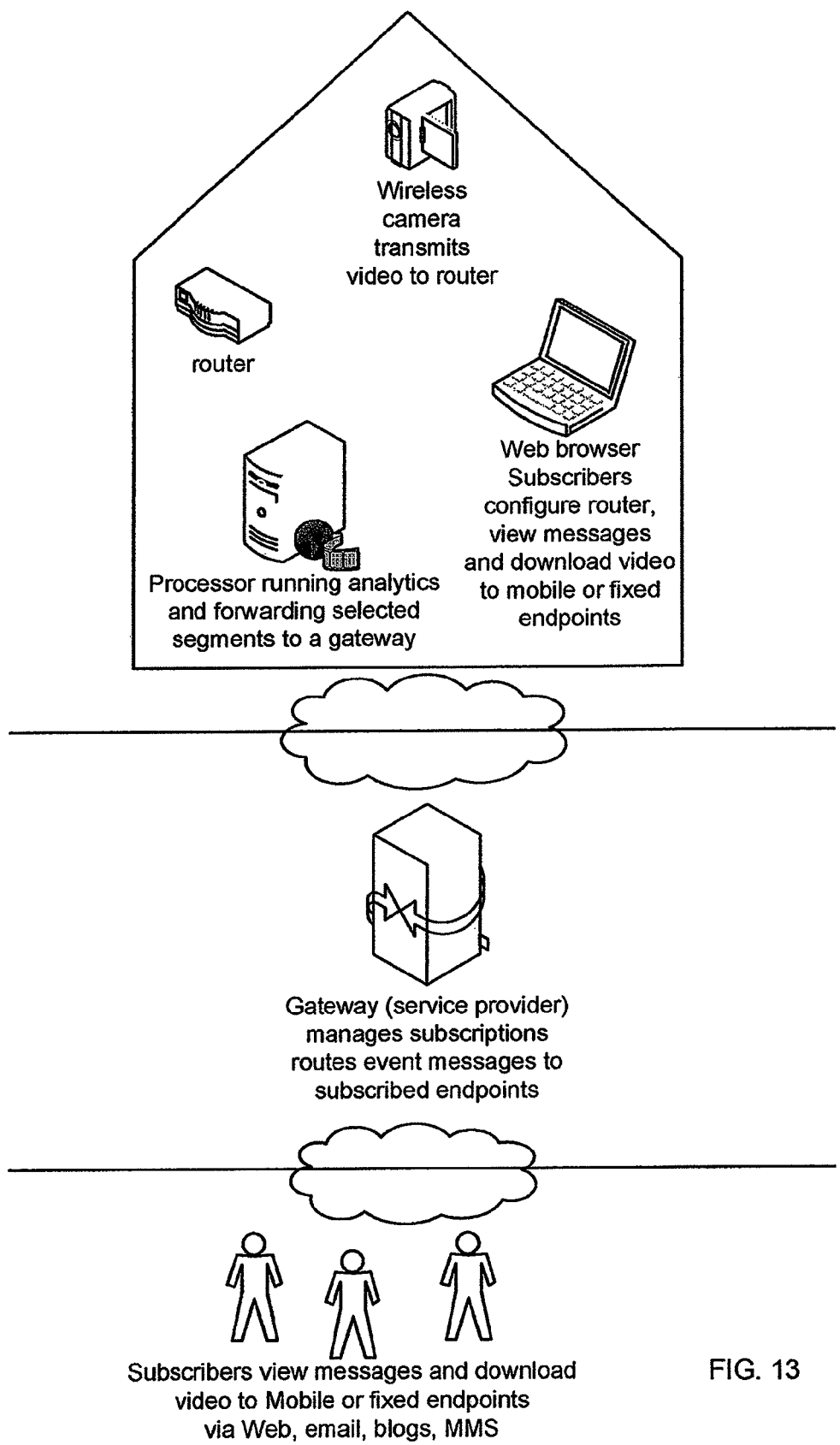
FIG. 13 is a schematic illustration of a system of a content-based, video subscription service using video analysis.

A further embodiment, illustrated in FIG. 13, is a content-based video subscription system that involves providing a user-definable profile describing the types of video content the user would like to have forwarded to him or her from a server running video analytics interoperable with the user's profile. Alternatively or additionally, the server can send the user information about the video (e.g. time, source, content) based on its content. In the embodiment in which the user receives information about videos based on content, the user can then choose whether to download the video from the server or not.

In the content-based video subscription embodiment the user can specify different user profiles associated with various transmission modes to accommodate the bandwidth and processing limitations of different receiving user devices. For example, the user can specify that short, compressed clips of video containing news or coverage of selected sports teams be sent to a mobile device such as a PDA, smart phone, media-capable cellular phone, or other portable user device. The user device can be provided with the software necessary to play the compressed excerpts at an acceptable quality. The user's profile can specify which video sources the video analytics should monitor. For example, the analytics can be directed to crawl the web for content, run periodic searches for content, watch video content source sites such as YouTube, Google Video, or others, and/or monitor specified blog postings, classes of blogs, advertising, classifieds, or auction services. For example, during a political election, as user can build a profile to monitor political blogs and news outlets for video featuring a particular candidate or particular issues. A user's profile can additionally specify, for example, that selections of video containing scenes from a particular movie producer, actor, writer, director, YouTube broadcaster, organization, or having a further or another association trigger the generation and transmission of an event notice, such as an email to the user's email account. The email can contain instructions on how to download and view the video, such as a hyperlink to the relevant video or selected segments of the video. The video or segments selected according to the user's profile can be cached at the central server. A user can define and maintain one or more profiles simultaneously. A user can maintain profiles in different statuses, such as active or inactive. A user can have more than one active profile simultaneously. A user profile can also be programmed to monitor a web cam or several web cams.

Web-Hosted, User-Defined Content "Dashboard"

A further application of the inventive technology can use analytics to push relevant video content and information related to and/or describing the video content to an online interface, such as a "dashboard," that can allow a user to review, play, store and manage clips. Such an application can consult a user defined profile to analyze video from various sources including online subscription services, personal archives, clips and/or streams sent from friends or family, clips and/or content located at links sent to a designated email inbox, web cam content, YouTube or other video site content, search results, blogs, and other sources for desired content. Video content can then, depending on system limitations and the user profile, either be pushed to an online server equipped with a management architecture, or selected portions can be compressed and saved, or links can be assembled and provided for review.

In one embodiment of the web-hosted, user-defined content dashboard application, a secure token is created. This secure token is used to authorize recipients to interact with, and become a user on, the dashboard system based on privilege levels defined in the user profile. For instance, there can be multiple levels of authorization that allow the following access: a) the ability to view the event message alone, but not view video, b) the ability to view the message and play a short video clip within a pre- and post-event interval, the interval being defined in the profile, c) the ability to view event video and optionally live video from the camera responsible for the event, d) the ability to view event video and corresponding recorded video from spatially-nearby cameras for the duration of the event (past video), e) the ability to view live and recorded video from the event triggering camera and nearby cameras, and f) the ability to control an event camera capable of pan-tilt-zoom in order to view live video to examine the scene.

Targeted Advertising

Figure 14:
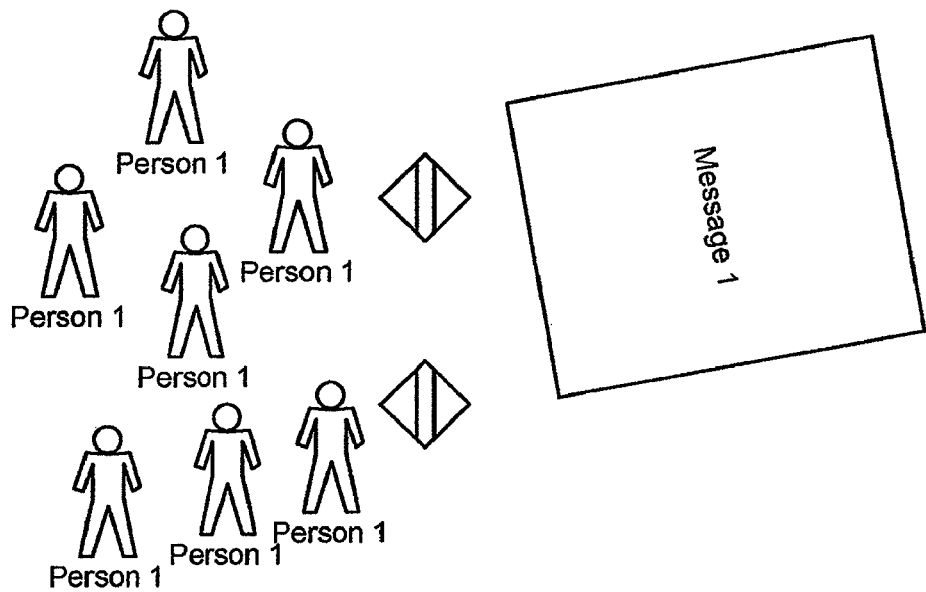
FIG. 14 is a schematic illustration of a method for conducting targeted advertising using video analysis.
Figure 14:
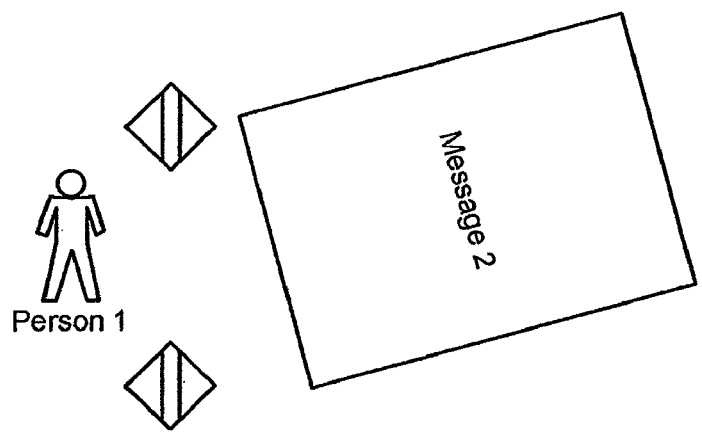

This application of the disclosed technology involves embedded advertising. This application can send advertising content along with video to a subscriber based on scene content. The advertising can be associated with the content of the video in order to be more effective through "targeting." Another application targets "live" advertising. This application uses video analytics to analyze video taken from the relevant target location to characterize the potential shoppers and vary the advertising message accordingly. This application employs one or more cameras, and optionally other sensors such as audio and/or ground-mounted pressure sensors. This application can also employ traditional motion sensors to gather additional traffic data. Additionally, this application uses a computer processor such as a personal computer, configured to run video analytics software interoperable with a user profile. This application can also use a control module to direct messaging at one or more active advertising devices such as marquees, billboards, and flat-screen displays. In one application, storefront advertising is tailored according to the people outside a storefront or near a billboard. For example, as illustrated in FIG. 14, advertising can be tailored based on the number of people present in the advertising zone, how long they have been there, and/or whether they are children or adults, or predominantly men or women. In another, related application, the same approach can be used after business hours to observe the storefront or other advertising zone. For example, the displayed "advertising message" can be adjusted to show a "lurker" that he or she is being observed, for example via some type of notice on a screen that is used to display ads. Messaging criteria for this application can be controlled through specifications in a user profile. This application can target messages at a mall or other commercial area. A refinement of this application can analyze video to determine the general reaction of targeted audiences to a particular message and to make adjustments accordingly. For example, if the analytics notices a positive reaction to a particular message, such as through physical manifestations such as smiles, laughter, or thoughtful consideration, the message can be sustained, continued, or otherwise pursued. If the analytics notices only quick glances, lack of attentiveness, or disinterest, the message can be changed.

Channel Controller

This application of video analysis is a channel-switcher that switches content channels (broadcast television, Internet-based content channels, etc.) based on content analysis and a user profile. Analytics can continuously scan channels for desired content and either switch automatically when that content is found or display an event notice providing the viewer the option to switch to the channel with the found content. This application can also be used to record desired content automatically, for example in a DVR application. This application can also be used to switch away from a channel when certain content, such as objectionable content, is found. For example, this application can be used to determine when violence is present and then tune away from the offending station, and additionally to lock the station out for a pre-selected period of time, such as 15 or 30 minutes. This application can therefore be desirable for use in ensuring appropriate content for younger viewers.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the invention can be implemented using Java, C++, or other object oriented programming language and development tools. Additional examples of computer code include, but are not limited to, control signals, encrypted code, and compressed code.

The invention claimed is:

1. A method, comprising:
receiving video data;
analyzing the video data with reference to a profile to select a segment of interest associated with an event of significance;
encoding, based on the profile, (1) the segment of interest to produce an encoded segment of interest, (2) preceding video data associated with a time prior to the event of significance to produce encoded preceding video data, and (3) subsequent video data associated with time after the event of significance to produce encoded subsequent video data; and
sending, based on the profile, to a user display device over a network a representation of the segment of interest for display at the user display device, and an event notice to the user display device over the network to trigger the user display device to download a representation of the encoded preceding video data and a representation of the encoded subsequent video data from a storage server.

2. The method of claim 1, further comprising consulting the profile to send data associated with the segment of interest to the user display device via the network to trigger the user display device to download the encoded segment of interest from the storage server.

3. The method of claim 1, wherein the representation of the segment of interest includes a compressed portion of the segment of interest.

4. The method of claim 1, wherein the representation of the segment of interest includes a URL pointing to a network address associated with the segment of interest.

5. The method of claim 1, wherein the event of significance includes a person entering a defined area.

6. The method of claim 1, further comprising filtering the video data according to the profile.

7. The method of claim 1, wherein the event of significance includes a vehicle moving into or out of a defined area.

8. The method of claim 1, wherein the event of significance includes the removal of an object from a defined area.

9. The method of claim 1, wherein the event of significance includes an object left in a defined area.

10. A method comprising:
receiving video data;
analyzing the video data for relevant content according to a user-defined profile;
consulting the user-defined profile to determine a treatment of the relevant content;

encoding, based on the user-defined profile, (1) video data representative of the relevant content to produce encoded video data, (2) video data associated with a time prior to the relevant content to produce encoded preceding video data, and (3) video data associated with time after the relevant content to produce encoded subsequent video data; and sending the encoded video data according to the treatment, and an event notice to a user display device via a network to trigger the user display device to download a representation of the encoded preceding video data and a representation of the encoded subsequent video data from a storage server according to the treatment.

11. A system, comprising:

a video analyzer configured to analyze video data generated by a video camera;

a storage server configured to receive, from the video analyzer, preceding video data associated with time prior to a segment of the video data and subsequent video data associated with time after the segment of the video data, the storage server configured to consult a user profile containing user preferences to encode the segment of the video data to produce an encoded segment for transmission via a network, the storage server configured to transmit the encoded segment of the video data, the storage server configured to encode, based on the user preferences, the preceding video data to produce encoded preceding video data and the subsequent video data to produce encoded subsequent video data; and a media device configured to receive the encoded segment, the encoded preceding video data and the encoded subsequent video data from the storage server, the media device configured to display the video data.

12. The system of claim 11, wherein the user profile includes specifications of mode and order of analysis, selection criteria for selecting the segment of the video data, selection criteria for selecting a transmission mode, selection criteria for selecting a receiving device address, and selection criteria for selecting a transmission priority.

13. The system of claim 11, further comprising at least two video analyzers, the at least two video analyzers reside each at different nodes in the network, the user profile is interoperable with and readable by each of the at least two video analyzers.

14. A method, comprising:

receiving video data;

analyzing the video data with reference to a user profile to select a segment of interest from the video data, the segment of interest associated with a significant occurrence at a location associated with the video data;

encoding, based on the user profile, (1) at least a portion of the video data including the segment of interest to produce encoded video data, (2) a portion of the video data associated with a time prior to the segment of interest to produce encoded preceding video data, and (3) a portion of the video data associated with a time after the segment of interest to produce encoded subsequent video data; and sending, based on the user profile, at least a portion of the encoded video data to a recipient device via a network, and an event notice to the recipient device to trigger the recipient device to download a representation of the encoded preceding video data and a representation of the encoded subsequent video data from a storage server.

15. The method of claim 14, further comprising receiving routing instructions from a subscriber; and sending a representation of the video data to the subscriber.

16. The method of claim 14, further comprising sending at least a portion of the video data to the storage server.

* * * * *